Oct. 20, 1970     L. FISHER     3,534,478

EXTENSIBLE STEEL TAPE RULES

Filed Dec. 11, 1968     2 Sheets-Sheet 1

United States Patent Office 3,534,478
Patented Oct. 20, 1970

3,534,478
EXTENSIBLE STEEL TAPE RULES
Leo Fisher, Brookman's Park, England, assignor to Fisco Products Limited
Filed Dec. 11, 1968, Ser. No. 783,065
Claims priority, application Great Britain, Dec. 19, 1967, 57,542/67
Int. Cl. G01b 3/10
U.S. Cl. 33—138      7 Claims

ABSTRACT OF THE DISCLOSURE

An extensible steel tape rule having a casing with a slot therein through which a tape wound onto a drum within the casing extends, the casing having a window through which graduations on the tape may be viewed, the tape being wound onto the drum in the opposite sense to which it would conventionally be wound, permitting inside and outside measurements to be directly readable on one and the same printed scale and at index points in plain view from the conventionally upper side of the casing.

---

This invention relates to extensible steel tape rules.

A conventional extensible steel tape rule includes a casing having a slot therein through which the steel tape extends. Inside the casing, the tape is wound into a coil on a drum which may be spring loaded to return the tape automatically to its retracted position on release of a brake. To effect a measurement, the outer end of the tape is provided with an L-shaped member and one or both faces of the tape has graduations. For certain measurements, for example, the distance between two parallel surfaces, the length of the casing must be added to the amount of tape which has been extended or alternatively the casing is provided with a window through which a direct reading of a graduation lying within the casing may be taken, the length of tape between the slot and where the reading is taken being equal to the length of the casing or the graduations viewed through the window having their origin some distance from the L-shaped member.

In rules which are provided with a window, it has previously been necessary to provide graduations on both sides of the tape so as to permit measurements to be taken both with an without the use of the window because the tape in passing through the slot has been wound on to the drum in conventional manner (as herein defined).

It is the main object of this invention to provide an extensible steel tape rule which will enable readings to be taken both through a window in the casing and also without the use of the window and with the tape having graduations on only one face.

According to the present invention there is provided an extensible steel tape rule having a casing with a slot therein and a graduated tape which passes through the slot and is wound into a coil on a drum within the casing, the casing having a window through which the graduations on the tape may be observed, in which the tape is wound on to the drum in the opposite sense to which it would conventionally be wound as it passes through the slot. The tape on entering the casing through the slot may be guided to pass immediately beneath the window in the casing.

Four embodiments of extensible steel tape rules constructed according to the invention will now be described, by way of example only, and with reference to the accompanying drawings, in which.

Figure 1:
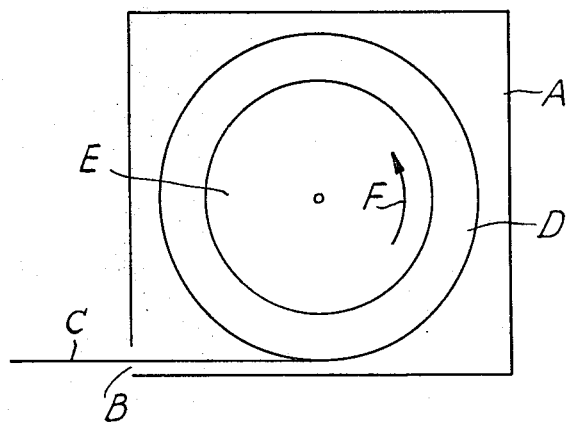
FIG. 1 is a diagrammatic view of a conventional steel tape rule.

The rule diagrammatically shown in FIG. 1 is to illustrate what is meant in this specification by the word "conventional" in describing the manner in which the tape is wound into a coil. In FIG. 1 there is a casing A with a slot B through which a tape C extends, the tape C being wound into a coil D on a drum E. By "conventional" is meant that the tape C is wound into the coil D in the sense of arrow F.

Figure 2:
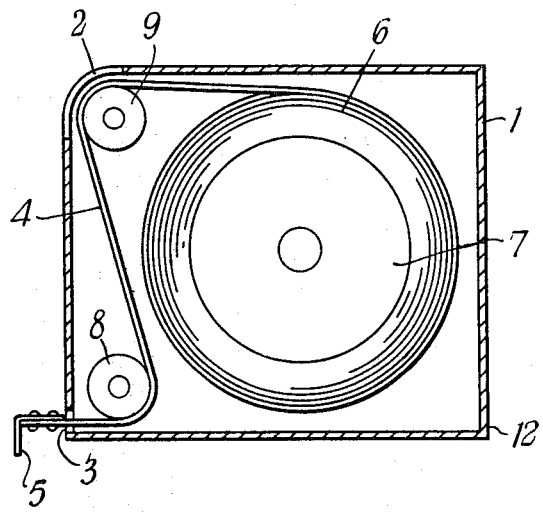
FIG. 2 is a longitudinal cross-sectional view through a rule in accordance with the invention.
Figure 3:
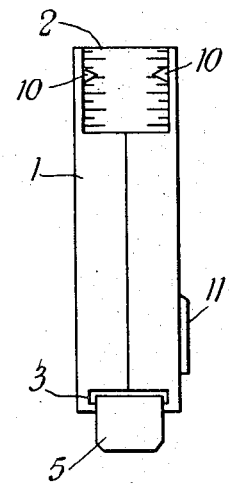
FIG. 3 is an end elevation of the rule of FIG. 2.

The rule according to the invention shown in FIGS. 2 and 3 has a casing 1 with a window 2 and slot 3 therein. Passing through the slot 3 is a tape 4 having an L-shaped member 5 at its outer end and wound into a coil 6 on a drum 7. Within the casing 1 the tape 4 passes over guide rollers 8 and 9 so that the tape is wound into a coil 6 in the opposite sense to conventional practice. As will be appreciated from FIG. 2, the tape 4, on entering the slot 3, lies approximately tangentially to the coil 6 and therefore the natural and conventional manner of winding the tape into a coil would be for the tape to be wound in an anti-clockwise sense as viewed in FIG. 2 as illustrated in FIG. 1. However, with the present invention the tape 4 is wound in a clockwise sense as viewed in FIG. 2.

The roller 9 ensures that the tape passes immediately beneath the window 2 which is provided with reference or datum points 10. The arrangement is such that the distance from the slot 3 to the rear face 12 of the casing is equal to the length of tape lying between the slot 3 and the reference or datum points 10. A brake and/or lock of any desired construction may be provided and operated by lever 11 outside the casing and the tape may be spring returned.

It will be appreciated from the foregoing that with this construction it is necessary to provide graduations on only one face of the tape 4, namely that face viewed through the window 2 and the same set of graduations may be used for taking measurements between two points where only the tape itself is used and also between two parallel surfaces where the casing as well as the tape is used. The fact that graduations have to be applied to only one surface of the tape has considerable manufacturing advantage and obviates mis-measurement by use of the wrong set of graduations.

Figure 4:
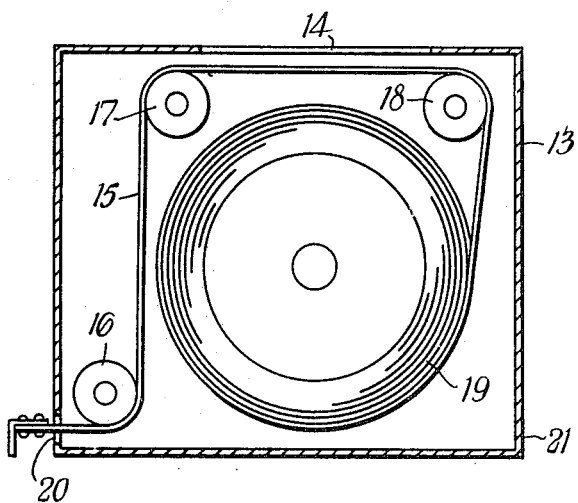
FIG. 4 is a longitudinal cross-sectional view through a further rule in accordance with the invention.

In the rule illustrated in FIG. 4, a casing 13 has a window 14 and a tape 15 passes over guide rollers 16, 17 and 18 to be wound into a coil 19 in the opposite sense to conventional practice. Here again, conventional practice would demand that the tape be wound in an anti-clockwise sense as shown in FIG. 1 but according to the invention the tape is wound in a clockwise sense. Again, the distance of the tape lying between slot 20 and a reference or datum point on the window 14 will be equal to the distance from slot 20 to the rear face 21 of the casing. A brake may be associated with the tape and the coil may be spring returned.

Figure 5:
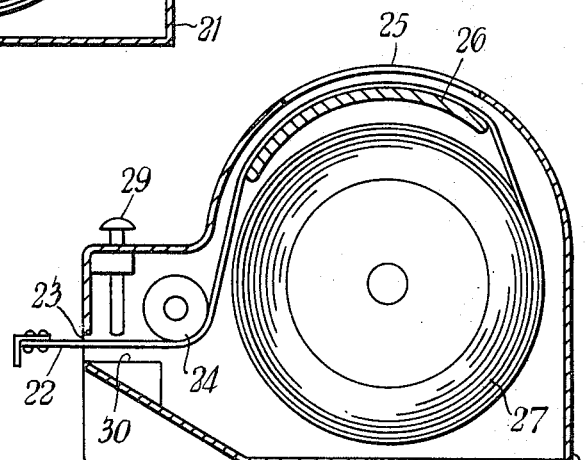
FIG. 5 is a longitudinal cross-sectional view through a still further rule in accordance with the invention.

In the rule illustrated in FIG. 5, a tape 22 enters slot 23, passes over roller 24 and is then guided under window 25 by passing over platform 26 to be wound in the reverse sense from conventional practice into coil 27. A reference or datum point will again be provided on window 25 in such a position that the length of tape 22 from slot 23 to the reference point equals the distance from slot 23 to the rear face 28 of the casing. The rubbing surface of the platform 26 may be coated with an anti-friction material such as P.T.F.E. (polytetrafluorethylene). A brake, for example a button 29, may be provided having an operative portion within the casing which wedges the tape 22 against a block 30. The brake enables the tape to be temporarily retained in an extended condition.

Figure 6:
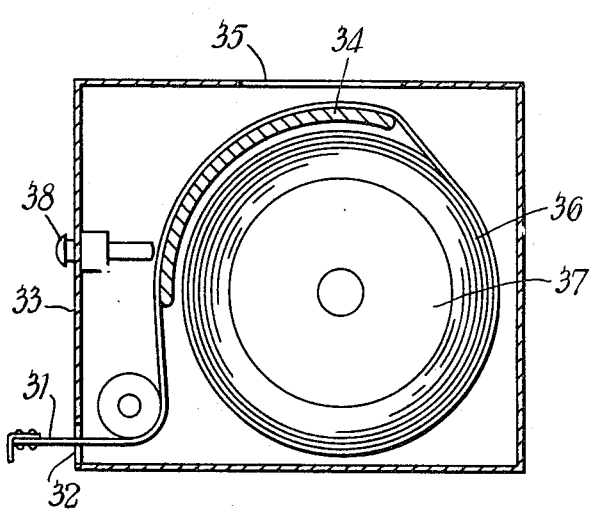
FIG. 6 is a longitudinal cross-sectional view through a modified rule in accordance with the invention.

Referring now to FIG. 6, a tape 31 enters a slot 32 in a casing 33, passes over a guide platform 34 beneath a window 35 and is wound into coil 36 on drum 37. Again the tape 31 is wound into coil 36 in a reverse sense to conventional practice. A brake 38 enables the tape 31 to be retained in any extended condition by wedging the tape against the platform 34.

Both the brake of FIG. 5 and the brake of FIG. 6 may be incorporated in the same rule.

Various modifications from the above described embodiments may be made within the scope of the invention, for example, the window may be situated other than in the positions illustarted in the various figures. Further, the guide rollers may be replaced or augmented by a guide platform or platforms.

A further feature of the invention includes the colouring of the viewing window, for example, the material of which the window is made may be tinted green. Persons using the rule would then be directed to remember that inside measurements, in which the length of the casing is involved, must always be observed in green. Other measurements, in which the length of the casing is not involved, would be made directly on to the extended tape in white because most tapes have black graduations on a white background. The viewing window of each of the embodiments may be provided with a lens for magnifying the reading and the window may be multi-coloured thereby indicating that if the tape has two sets of graduations, each set has an associated colour and the reading must be taken in that colour.

I claim:
1. In an extensible steel tape rule,
   a casing having a slot therein,
   a graduated tape which passes through the said slot,
   a drum mounted for rotation within the said casing,
   the said casing having a viewing window through which graduations on the tape may be observed,
wherein the improvement comprises the said tape being wound on to the said drum in the opposite sense to which it would conventionally be wound as it passes through the said slot.

2. In an extensible steel tape rule as claimed in claim 1 the improvement comprising
   at least one guide within the said casing for the tape whereby the said tape on entering the said casing through the said slot is guided to pass immediately beneath the said window in the casing.

3. In an extensible steel tape rule as claimed in claim 2, the improvement comprising
   the said guides consisting of rollers.

4. In an extensible steel tape rule as claimed in claim 2, the improvement comprising
   the said guides consisting of a roller and a platform.

5. In an extensible steel tape rule as claimed in claim 1, the improvement comprising
   a brake or lock including an operating button externally of the said casing, said button being fixed to an operative member adapted to wedge the said tape against a block or platform on operation of the said button for temporarily retaining the tape in an extended condition.

6. In an extensible steel tape rule as claimed in claim 5, the improvement comprising
   the said brake being positioned near to the said slot.

7. In an extensible steel tape rule as claimed in claim 5, the improvement comprising
   the said brake being positioned to wedge the said tape against a platform which extends under said viewing window.

References Cited

UNITED STATES PATENTS

| | | |
|---|---|---|
| 537,082 | 4/1895 | Stuart. |
| 1,058,311 | 4/1913 | Lewis et al. |
| 1,237,808 | 8/1917 | Ottinger. |
| 1,986,551 | 1/1935 | Anderson. |
| 2,016,483 | 10/1935 | Carlson. |
| 2,207,277 | 7/1940 | Volz. |
| 2,380,073 | 7/1945 | Robinson. |
| 3,281,943 | 11/1966 | Maksim. |
| 3,494,038 | 2/1970 | Quenot. |

FOREIGN PATENTS

| | | |
|---|---|---|
| 253,421 | 6/1926 | Great Britain. |
| 991,888 | 5/1965 | Great Britain. |
| 195,999 | 5/1938 | Switzerland. |

ROBERT B. HULL, Primary Examiner